Inventors
Karl Maybach & Richard Seifert
by Karl Michaelis, Atty.

UNITED STATES PATENT OFFICE 2,688,259

ENGINE CONTROL FOR MOTOR VEHICLES

Karl Maybach and Richard Seifert, Friedrichshafen (Bodensee), Germany; said Seifert assignor to Maybach-Motorenbau G. m. b. H., Friedrichshafen, Germany, a German firm Application December 28, 1949, Serial No. 135,401

Claims priority, application Germany December 30, 1948

7 Claims. (Cl. 74—472)

This invention concerns a regulating arrangement of the type which is applied to power transmissions of power vehicles driven by means of internal combustion engines, and having a mechanical change speed gear and an automatic gear change apparatus. The invention is particularly useful for rail vehicles such as motorized rail cars and locomotives.

In such vehicles at a basic adjustment of the regulator member of the engine made by the operator (for example of the regulator lever for the supply of fuel which may be continuously adjustable over its range or adjustable in a few definite stages) the power output of the engine and the speed are exclusively determined by the travel resistances which must be overcome.

More especially in the case of rail vehicles the driver is not able to determine the correct instant for changing gear by judging the speed by the sound of the engine, as is possible with street vehicles. Thus with rail vehicles the driver usually changes gear too late i. e. the gear change is effected at a too high engine speed. The attention of the driver is also occupied in observing the track and the signals, and it is desirable that he should not be troubled with changing gear. For such vehicles therefore an automatic gear change apparatus (for example one dependent on the speed of the vehicle) is necessary for operating the change speed gears.

The known automatic gear change apparatus for mechanical gear changing could not, up to the present, be introduced to any great extent, because the driving engine, when using such automatic arrangements, must run very frequently with relatively high speed, resulting in noise, high strain and therefore considerable wear of the driving parts, impacts on the gears and also in high fuel consumption. It is an object of the invention to overcome these disadvantages.

According to the present invention, a regulating arrangement of the type referred to is provided in which, at basic adjustments of the regulating members of the engine, the power output of the engine is automatically altered by changing the fuel supply, which is regulated in dependence on the speed of rotation of the engine.

Thus a definite desired or, according to the driving conditions, required control of the engine output is produced within the range of speed of the change speed gear, so that the torque produced by the engine increases in a definite manner, or so that the output is kept uniform by the regulating arrangement at the basic adjustment.

The change of the gear ratio and the variation of mean cylinder pressure are preferably relatively to each other effected in such a manner that on changing gear no great difference in the tractive forces occurs (for example not more than 10% change), so that the driving conditions are not unfavourably affected by the gear change. This adjustment can also occur in such manner that the engine output remains about the same over the whole speed range. On changing from one gear to another the power output before and after gear change is practically the same, the tractive force graph showing no break at the moment of gear change. Particularly advantageous in this respect has been found a change in gear ratio from 1:2 to 1:3.

The regulation can however be so provided that greater power outputs are produced at the lower speeds than at the higher speeds within individual speed ranges, the outputs being greater than hitherto possible at the individual speeds. Thus the tractive forces after a gear change are greater than before.

The advantages obtained with a regulating arrangement in accordance with the invention are greatly enhanced if, in connection with the new regulating arrangement, the automatic gear change apparatus for the change speed gear is such that the speeds of rotation of the engine at which gear changes are effected are changed according to power output, so that at a smaller output automatic gear change is effected at a lower speed than at a greater output. Whereas in conventional devices the uppermost range of speeds of rotation is also used for driving with partial power, the invention provides lower rotational speeds when the output of the engine is reduced. The reduction of the gear change speed need not be effected at all basic adjustments or ranges of the driving power and, individual power ranges may use the same speed range, or the speed ranges may overlap to a greater or lesser extent. According to the invention an individual gear is used at partial outputs only so far that it produces speeds, which correspond to the range of speeds of rotation pertaining to the chosen power output.

To obtain especially high outputs through the regulating arrangement according to the invention, the charge of the engine is preferably increased at decreasing rotational speed.

A particularly advantageous arrangement is obtained if, at certain basic adjustments by the regulating means, the engine output between different gear speeds is automatically regulated in dependence on the engine speed according to a suitable law.

A centrifugal governor is preferably arranged to respond to a shaft speed ahead of the main clutch, which governor controls the fuel admission and, as the case may be, the moment of injection, one or two additional centrifugal governors being provided to be driven by a shaft between the main clutch and the change speed gear which additional governors effect the gear changes in the change speed gear.

The operation of a power vehicle provided with one form of a regulating arrangement in accordance with the invention is performed in such a manner that (at basic adjustments of the regulating members for the supply of driving medium to the engine) the output of the engine is automatically regulated in accordance with one or more driving variables, for example the speed of rotation of the engine, to follow a desired course, and that the speeds of the engine at which gear changes occur are lower at partial power production of the engine.

By the invention, fundamental difficulties are avoided, which have hitherto prevented the use of purely mechanical power transmissions in highly powered railway vehicles.

In addition to a mechanical change speed gear transmissions of another type may be used, especially turbo-converters.

The advantages of the invention are particularly great if change speed gears having a great number of gear ratios, for example eight, are used. The system according to the invention produces better travel performances, less wear and greater driving convenience than conventional systems, even if they are provided with more than eight speed ratios. The extent of the available speed range is thereby considerably increased and the same vehicles can be used for different purposes. Locomotives for instance can be used both for freight and passenger service, which require considerably different top speeds so that the holding in reserve of vehicles is greatly simplified.

The fuel consumption of a vehicle equipped according to the invention is considerably lower than that of a vehicle of the usual construction since, when travelling at a definite speed the same engine output is obtained at lower engine speed, and with a more favorable compression.

The invention will be further described by way of example with reference to the accompanying drawings in which.

Figure 1:
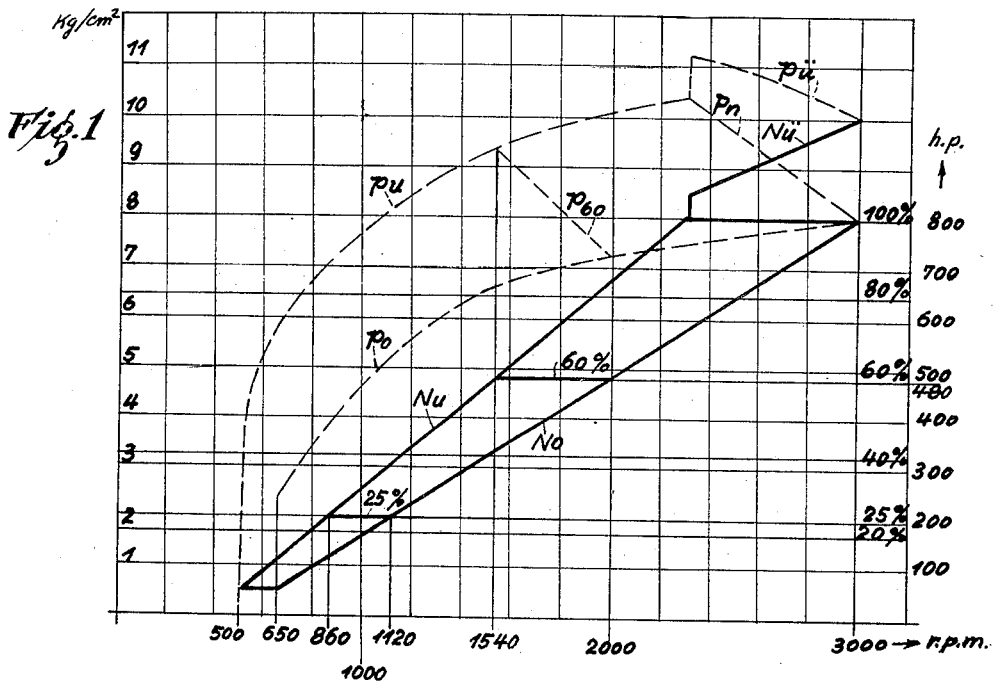
Figs. 1 and 2 are output and speed diagrams of a vehicle equipped according to the invention.

Fig. 1 shows output curves of a power transmission according to the invention for a rail vehicle, Nu designating the output curve for the lower gear change points, No that for the higher gear change points. The horizontal distance between the curves indicates the rotation speed range of the individual change speed gears at a definite partial power output adjustment. In this case the regulating arrangement according to the invention is so constructed that at a basic adjustment made by the operator the power output is maintained. If, for example, the driver adjusts a basic output of 60% (horizontal line denoted by 60%) and the speed of rotation is less than 1540 R. P. M. the speed will increase to 1540 R. P. M. and the output to 480 H. P. At a further increase of the speed of rotation of the engine the output will remain constant till a speed of 2000 R. P. M. is attained. If there is still an excess of power, a gear change into the next higher gear will be effected.

Figure 2:
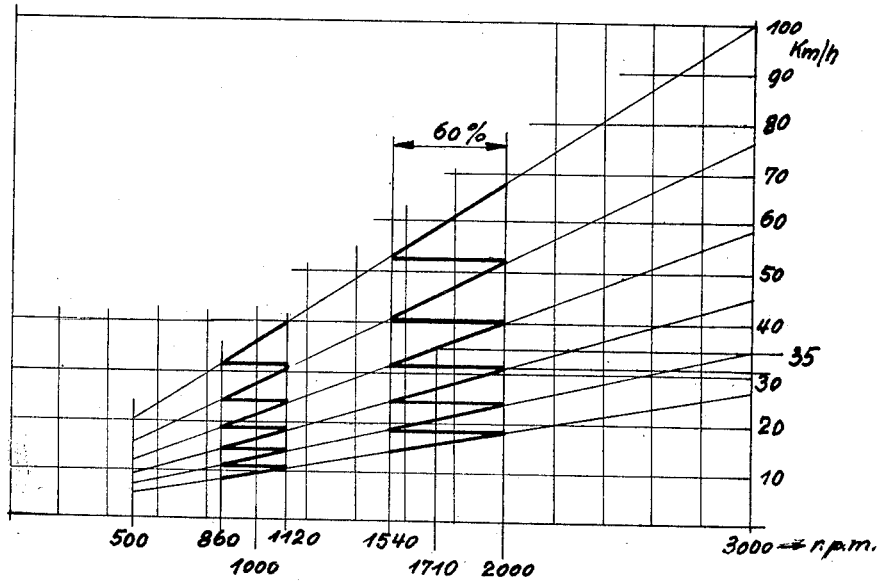

Fig. 2 shows the velocity of the vehicle in relation to the engine speed. If previously, for example, the 3rd speed gear was put in operation, the vehicle travels at 31 km./hr.; after shifting into the 4th speed gear, the travel speed beginning at 1540 R. P. M. of the engine will increase at constant power output of the engine to 41 km./hr. whereupon shifting into the 5th speed gear is effected, and so on. In Fig. 6 the speeds of travel which are available at the basic adjustment are shown by heavy lines. With a basic adjustment of, for example, 25% shifting is performed within the range between 860 and 1120 R. P. M. Thus, to each basic power output adjustment, for example, by means of the fuel lever by the driver, there corresponds a definite speed range; within this range of speeds of rotation the engine can be operated at the preset output and the vehicle can be driven with any of the change speed gears, according to the prevailing travel resistance. This embodiment of the invention has the advantage that the whole range of the speed of rotation and of the output of the engine can be used in any desired fine gradation and the most favourable conditions can be produced.

The regulation of the driving power can be effected in any other manner than that which is illustrated and in which the driving power is constant at a definite basic power output. The output lines Nu and No may be continuous or may be variably curved, or may be irregular.

The dashed line $pu$ in Fig. 1 shows the mean cylinder pressure corresponding to the lower output line Nu, the line $po$ indicates mean cylinder pressure corresponding to the upper output line No, and the line $pn$ the mean cylinder pressure corresponding to a constant power-output of 800 H. P. A further position of the regulating lever produces overload whereby the regulating arrangement produces a power output corresponding to the line Nü. The dashed line $p\ddot{u}$ shows the mean effective pressure at overload and the line $p60$ illustrates the mean effective pressure for the described basic adjustment of 60%.

The points of intersection of the dashed lines $p60$ and $pn$ with the dashed lines $pu$ and $po$ indicate that the mean effective pressure produced by the system according to the invention is greater at the minimum speed of the speed ranges prevailing at each speed of the change speed gear at a certain fuel supply (and engine output) adjusted by the vehicle driver than at the maximum speed of the aforesaid speed ranges so that the tractive effort produced by the system is greater at the lower speeds of the speed ranges than at the higher speeds and the tractive effort produced by the new system comes closer to the ideal conditions than in conventional systems. The aforedescribed result is produced by the supplemental fuel supply control means 194 to 205 which will be described later.

Figure 3:
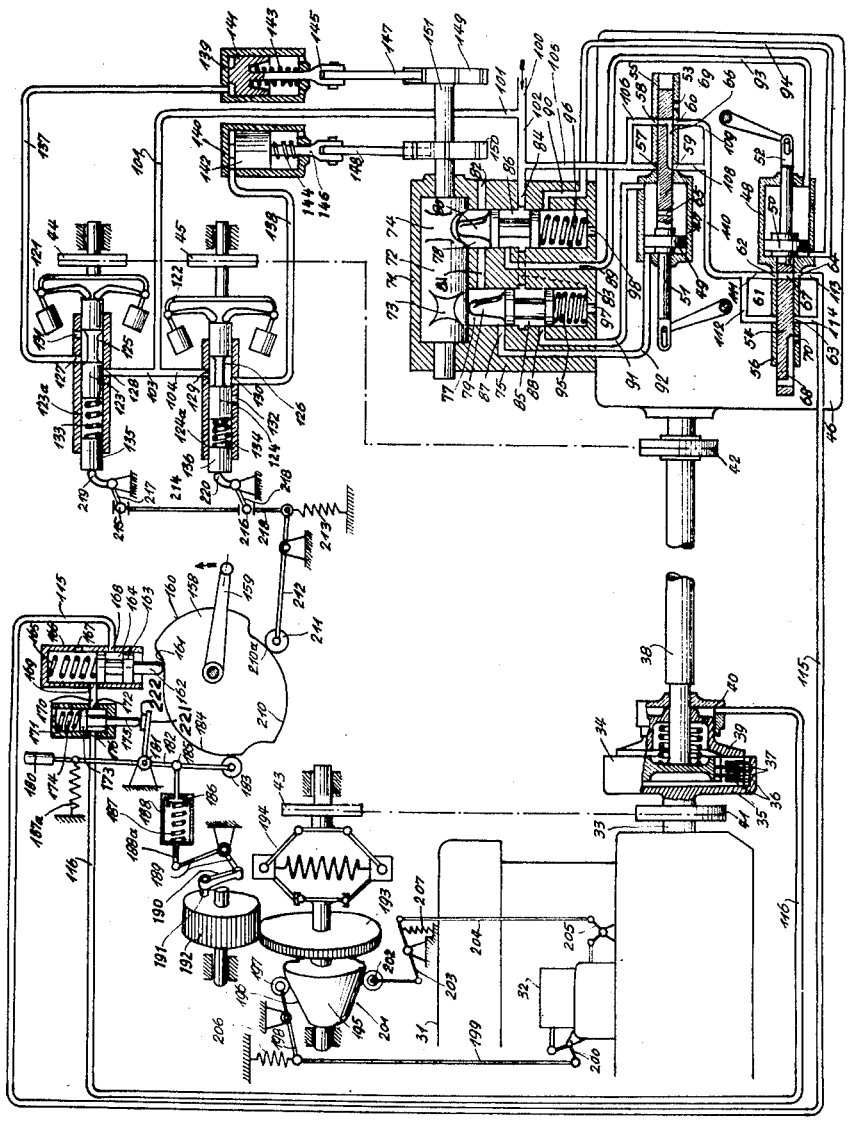
Figs. 3 and 4 are part sectional diagrammatic illustrations of mechanical arrangements according to the invention.

Fig. 3 is a part sectional illustration of a control system according to the invention for a locomotive driven by a diesel engine and having a change speed gear for four speed ratios. The engine power corresponds thereby to that shown in Fig. 1; the four speed gears produce the speeds of rotation and the car velocity lines shown for the gears 1 to 4 of Fig. 2.

In Fig. 3, numeral 31 designates the diesel engine provided with a fuel pump 32; 33 is the crank shaft of the engine on the end of which the casing 35 of a main clutch 34 is arranged; 36 are friction discs connected with the casing 35; 37 are friction discs connected with the driven shaft 38; 39 is a piston in a pressure oil cylinder 40 by which the friction discs are pressed together against the action of a spring. 41 and 42 are small belt pulleys from which further pulleys 43, 44 and 45 are driven; 46 is a change speed gear of a type as shown, for example in Patent No. 2,352,212, the gear changes of which are effected by means of the piston rods 51 and 52, of pistons 49 and 50, in cylinders 47 and 48, respectively. 53 and 54 are slide valves connected with the pistons 49 and 50, which are displaceable in guides 55 and 56 extending from the cylinders 47 and 48, respectively. 57, 58, 59, 60, 61, 62, 63, 64 are control openings in the guides 55 and 56; 65, 66, 67, 68 are passages in the slide valves 53 and 54; 69 and 70 are deaeration openings.

71 is the housing of a regulating roller 72 with cams 73 and 74; 75 is a valve casing with bores 77 and 78, in which valves 79 and 80 are displaceable; 81 and 83 are connecting passages between the bores 77 and 78; 82 is a connecting passage to the outside; 84 is a passage for the supply of oil pressure; 85, 86 are recesses in the bores 77 and 78; 87, 88, 89 and 90 are passages to which pipes 92, 91, 93, 94, respectively, are connected which lead to the cylinders 47 and 48. 95 and 96 are compression springs; numerals 97 and 98 designate openings connecting the housings of springs 95 and 96 with the outside. 100 is a pressure oil supply pipe which forks into two pipes 101 and 102. The pipe 101 branches into two pipes 103 and 104. From the pipe 102 branches a pipe 105, and from the latter a pipe 106. The two pipes 108 and 109 unite in pipe 110, which forks into two branches 111 and 112. The pipes 113 and 114 combine to form the pipe 115. The pipes 105, 106, 108, 109 terminate in the valve guide 55 and the pipes 111, 112, 113, 114 terminate in the valve guide 56. Pipe 116 is connected with the pressure oil cylinders 40 of the main clutch 34. 121 and 122 are two centrifugal governors which are driven by the pulleys 44 and 45, respectively, and act on slide valves 123 and 124 having recesses 125 and 126, respectively. These slide valves are displaceable in housings 123a and 124a, respectively. 127, 128, 129, 130 are regulating openings in the housings 123a and 124a; ports 131 and 132 connect the housings with the outside; 133 and 134 are compression springs; 135 and 136 are small pistons; 137 and 138 are connection pipes between the casings 123a and 124a and the cylinders 139, 140, respectively, in which pistons 141, 142 are displaceable against the pressure of springs 143, 144. Piston rods 145, 146 act through pawls 147 and 148 on ratchet wheels 149 and 150, respectively, which are arranged on the axle 151 of the regulating roller 72. The two pawls 147 and 148 one of which lies on the front side, the other on the rear side of the respective ratchet wheel, are so far removed from the ratchet wheels, when in rest position, that if one pawl is engaged, the other pawl is ineffective.

Numeral 158 designates a cam disc which can be rotated by a lever 159. The circumference of the disc 158 forms three cams of which the first, 160, begins with a raised portion 161. Cam 160 can be engaged by a pin 162 which is arranged at the lower end of a slide valve 163 which has an annular cavity 164 and is displaceable in a housing 166 against the pressure of a spring 165. 167 is an aperture connecting the housing 166 with the outside; 168 is an opening to which the pipe 115 is connected. 169 is a port which is connected by a pipe 170 with an opening 172 in a cylinder 171 in which a piston 173 is displaceable against the pressure of a spring 174. A pin 175 is connected with the piston 173. 176 is an opening in the housing 171 to which the pipe 116 is connected.

180 is a hand lever which is pivoted at 181 and has an arm 182 on the lower end of which a roller 183 is arranged, which roller can bear upon the cam 184 of the cam disc 158. To the lever 182 a short rod is pivoted at 185, a spring plate 186 being connected with the small rod and disposed in a cylinder 188 against one end wall of which the spring plate is pressed by a spring 187. 187a is a tension spring. The cylinder 188 is connected to a bell crank lever 189 by a small rod 188a. The bell crank lever 189 is connected with a crank pin 191 through a rod 190. This pin 191 is arranged on a gear wheel 192 which meshes with a gear wheel 193. 194 is a centrifugal governor driven by the pulley 43 for axial displacement of a cam 195, the latter can be simultaneously rotated by the wheel 193. The cam 195 has two cam surfaces. On one cam surface 196 lies a roller 197 which regulates the amount of fuel fed by pump through a bell crank lever 200. 201 is the other cam surface of the cam 195. On this lies the roller 202 which, through a two-arm lever 203 and a rod 204, acts on a bell crank lever 205 and thereby adjusts the injection moment of the fuel pump. The rollers 197 and 202 are pressed against the cam surfaces 196 and 201 by springs 206 and 207, respectively.

Cam 210 has an ineffective (circular) portion 210a which is engaged at the beginning of a counterclockwise rotation of the cam by a roller 211 which is held in contact therewith by a spring 213. The roller 211 is mounted on the free end of a two-arm lever 212. The other end of lever 212 is connected to a rod 214 on which two angular levers 217, 219 and 218, 220 are pivoted at 215, 216, respectively, which press against the small pistons 135 and 136, respectively. 221 is a lever arm connected to the lever 182. At the end of arm 221, a plate 222 is arranged against which the peg 175 can abut.

In the first gear the pistons 49 and 50 both stand in their left hand end position, in the second gear the piston 49 is in the right hand position and the piston 50 in the left hand end position.

For the third gear the piston 49 stands in the left hand position, the piston 50 in the right hand position, in the fourth gear both pistons stand in the right hand position.

Figure 4:
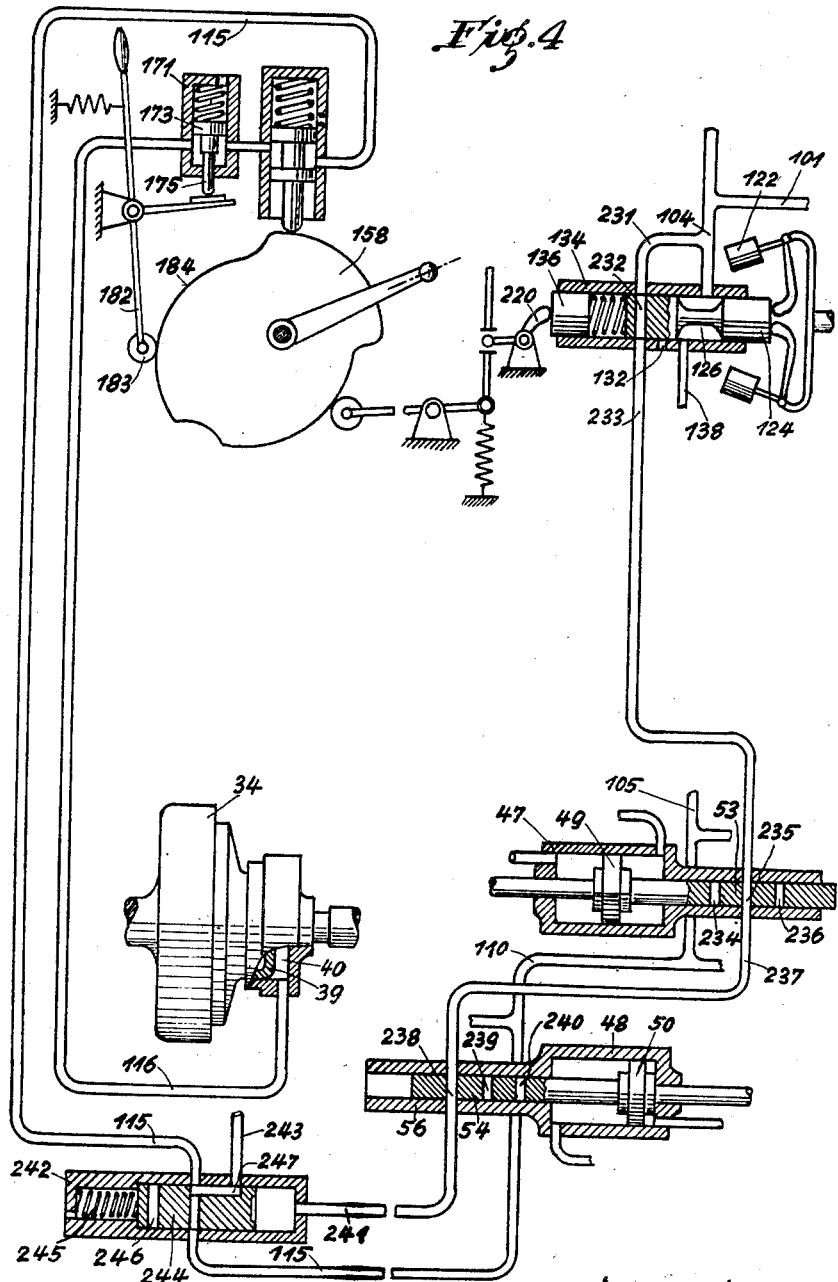

Fig. 4 illustrates a partial section through the valves 53, 54 and also through the valve 124 in another radial plane than the sections shown in Fig. 3. Besides the previously described numerals, 231 is a pipe branching off the pipe 106; numeral 232 designates a cross passage in the valve 124. 233 and 237 are connecting pipes; 234, 235, 236 are pasages in the valve 53; 238, 239, 240 are passages in the valve 54; 241 is a connection pipe to a cylinder 242 interposed in the pipe 115, to which is connected also a pressure oil pipe 243. A spring 245 presses on a slide valve 244 arranged in the cylinder 242 from the left, the slide valve 244 having a cross passage 246 and a groove 247.

In Fig. 3 the various parts are shown in the positions which they assume when the vehicle is stationary. The hand lever 159 stands in the "on" position. The engine 31 stands still as well as the centrifugal governors 121, 122 and 194. In the change speed gear, the first gear has been engaged. The piston 49 is therefore in its left end position in its cylinder 47, as also does the piston 50 in its cylinder 48.

The pipe 100 and the whole oil system receives no oil pressure since the oil pump (not shown) is not yet running. The rods 199, 200 for the adjustment of the amount of fuel fed by pump 32, and the members 204, 205 for the adjustment of the injection point moment are in the position of smallest feed and smallest preinjection. The pin 162 and the roller 211 engage the ineffective cam portions 161 and 210a at the beginning of the cams 160 and 210, respectively, the roller 183 being pressed by the spring 187a against the highest point of the cam 184. The slide valve 163 stands in its lowest position so that, as may be seen from the drawing, the pipes 170 and 116, and thereby the space of the cylinder 40 on the right of the piston 39 are connected with the outside through the port 167. The main clutch 34 is held in disengaged position by the clutch spring.

The engine 31 will now be started and run with low speed. The governor 194 is driven by the chain connecting pulley 41 to pulley 43. The governors 121 and 122 are driven by the pulley 42 through pulleys 44 and 45. Pressure oil is now supplied to the pipe 100 and passes through the pipes 102, 105, 106, the opening 58, the passage 66, the opening 60, the pipes 108, 109, 110, 111, the opening 62, the passage 67, the opening 64 and the pipes 113 and 115 to the cylinder 166 in the spaced form by the recess 164 of the valve 163. Up to this moment the position of none of the members of the apparatus has been changed.

If the driver moves the hand lever 159 through a certain angle upwards, and thereby rotates the cam disc 158 counterclockwise, the pin 162 passes on to the raised part of the cam 160. The peg 162 and with it the slide valve 163 are so far upwardly displaced, that the connection of the pipe 170 with the opening 167 is interrupted and pipe 170 is connected with the pipe 115 by the recessed portion 164 of the slide valve 163.

Pressure oil now passes from the pipe 115 into the pipe 170 and under the piston 173 as well as into the pipe 116 and to the cylinder 40. The friction clutch 34 is engaged through the oil pressure acting on the piston 39. The vehicle starts to move. The cam 195 is rotated by the roller 183 lying against the cam track 184 and through the transmission 182, 186—193, whereby amount of fuel and the injection moment corresponding to the changed load and speed of rotation is adjusted. Upon acceleration of the vehicle, the cam 195 is further displaced to the right by the governor 194 and the fuel feed and the moments of injection are continuously adjusted according to changing speeds of the engine shaft. The springs 133 and 134 of the governors 121 and 122, respectively, are slightly compressed by the pistons 135 and 136, the pressure of pistons 135 and 136 being caused by displacement of the cam 210 and consequent movement of the members 211, 212, 217, 219 and 218, 220. The fundamental adjustment made by the driver corresponds to 25% power output of the engine which accelerates (as seen in Fig. 1 to a speed of 860 R. P. M. The vehicle obtains thereby a speed of travel of 8 km./hr. If the driving resistances are so small that there is too much power available, the speed of travel and the engine speed both increase further. At the same time, corresponding to the increase in speed, the cam 195 is displaced farther to the right by the governor 194 and the amount of fuel, and the injection moment are so altered that the power output of the engine remains about the same (straight lines parallel to the abscissa axis in Fig. 1). This lasts until the engine speed of 1120 R. P. M. (speed of travel 11 km./hr.) is attained (Fig. 2). At this speed of rotation which is determined by the tension exerted on the spring 133 by the cam 210, the pendulum 121 effects gear shifting by moving the slide valve 123 towards the left. The recessed portion 125 connects the pipe 103 to the pipe 137 and pressure oil passes through the pipes 101, 103, 137 into the space above the piston 141, which is displaced downwards so that roller 72 is rotated clockwise (as seen from the left) by means of the pawl 147 and the ratchet wheel 149 so that the slide valve 79 is moved up into the recess 73 by the spring 95. While previously pressure oil is fed from the pipe 102 through the passage 84, the recess 86 of the slide valve 80, the passage 83, the recess 85, the passage 82 and the pipe 91 to the space on the right of the piston 49, this space is now connected, in the upper end position of the slide valve 79, through the passage 88 and the opening 97 with the outside, and the passage 83 is connected through the recess 85 with the passage 87 and through the pipe 92 with the space of the cylinder 47 to the left of the piston 49.

Thereby the piston 49 is moved towards the right, disengaging the claw clutch of the first gear and engaging the claw clutch of the second gear after the decrease of the speed of rotation down to 860 R. P. M.; prior to engagement of this new gear ratio the connections of the passage 66 through the port 59 with the pipe 108, and through the opening 58 wth the pipe 106, are both interrupted, and the passage 66 is connected with the outside through the opening 69. Thereby the oil pressure is relieved in the pipes 109, 110, 111, through the passage 67 and the pipe 115, and in the space under the piston 173 as well as in the pipe 116 and in the cylinder 40 in front of the piston 39. The friction clutch 34 is thereby disengaged. The downward movement of pin 175 under the action of the spring 174 is transmitted to the plate 222 and the lever 221, swinging the lever 182 to the left and raising the roller 183 from the cam 184. The amount of fuel and the injection moment is thereby automatically adjusted to smaller values during the gear change and the speed of rotation is reduced so that the new claw clutch can engage.

In the right hand end position of piston 49, the pressure oil from the pipe 105 can pass into the pipes 113 and 115 through opening 57, the passage 65 in the slide valve 53, the opening 59, the pipes 108, 110, 111, the opening 62 and the passage 67, and from conduit 115 under the piston 173, forcing it upwards. Oil pressure builds up also in the pipe 116 and in the cylinder 40 on the right of the piston 39, engaging the clutch 34. At this time the roller 183 is again pressed against the cam 184 by the lever 182 and the spring 187a, and thereby the amount of fuel and the moment of injection are adjusted according to the prevailing speeds of rotation.

The change from the second into the third speed gear and from the third into the fourth gear is performed in substantially the same manner as is the change from the first into the second gear. Continued counterclockwise of the hand lever 159 causes continued pressure oil supply to the cylinder 40, due to the action of the cam 160, control of the friction clutch 34. The fundamental adjustment of the engine output by controlling the fuel supply and the fuel injection moment is determined by the cam 184 according to the angular position of the cam. The tension of the springs 133 and 134 is regulated by the cam 210, whereby the gear change speed is adjusted.

The governor 194 automatically adjusts the amount of fuel and the injection moment according to the prevailing engine speed, determining the power output of the engine in the desired manner. If the speeds of rotation corresponding to the basic output are attained, the upward and downward gear change is automatically effected by the governors 121 and 122.

The downward gear change proceeds in a similar manner as the above described upward gear change. If the vehicle travels at a definite basic adjustment of the engine output, e. g. 60% in the fourth gear with a speed of 35 km./hr., the engine runs (as may be seen from Fig. 2) with a speed of 1710 R. P. M. The pistons 49 and 50 are in their right hand end positions. On increase of the driving resistance, the speed of travel is reduced and therewith the speed of the engine, and on reaching 31 km./hr. and 1540 R. P. M., the pendulums of the regulator 122 have moved inwardly so that the opening 132 is closed by the left hand part of the slide valve 124 and the pipe 138 is connected by the recess 126 of the slide valve 124 with the pipe 104 (in the position shown in the figure).

The oil pressure displaces the piston 142 downwardly and rotates the regulating roller 172 counterclockwise (seen from the left) through the pawl 148 and the ratchet wheel 150 into a position which corresponds to the third gear. The piston 49 travels to the left on account of the new adjustment of the slide valve 79 whereby the friction clutch is disengaged in the same manner as above described. After engagement of the claw clutch halves of the third speed gear, the amount of fuel is again increased due to contact of the roller 183 with the cam 184, the speed is increased, the friction clutch engaged, and the claw clutch halves ratcheting over one another are engaged on attaining the overtaking speed of rotation, in this case 2000 R. P. M. (Fig. 2).

The mechanism for this latter operation at a downward gear change is shown in Fig. 4. The section through the valves 53 and 54 lies in another plane than that shown in Fig. 3. The slide valves 53 and 54 are otherwise formed in the same way as shown in Fig. 3. The pendulums of the centrifugal governors 121 and 122 are in the innermost position when the engine stands still. The spring 134 is so designed and tensioned that as soon as the engine runs even at a low speed of rotation below 500 R. P. M. the pendulums 22 move into their outer position in which the pipe 138 is connected by the recess 126 of the slide valve 124 with the opening 132. According to the pressure acting on the slide valve 124 through the spring 134, i. e. according to the position of the cam disc 158, and thus according to the power produced by the engine, the speed of rotation at which the pendulums move inward, i. e. the lower gear change speed, is increased. When the lower gear change speed has been attained, and the pendulums 122 pass into the inner position so that the slide valve 124 assumes the position shown in Fig. 4 and brings about the gear change as described. Pressure oil will be fed through the pipe 231, the passage 232 and the pipe 233 to the slide valve 53 of the piston 49. In the end positions of the piston 49, the oil can pass through the passages 236 or 234 into the pipe 237 and to the slide valve 54 of the piston 50. Since the piston 49 when shifting from the fourth speed gear into the third speed gear, must be displaced from its right into its left end position, as soon as the previously engaged claw clutch is disengaged and the clutch halves to be engaged are in overrunning position, piston 49 being approximately in the middle position (as indicated in Fig. 4), the passage for the pressure oil through the pipe 237 and through the passage 238 towards the pipe 241 is free. The slide valve 244 will be displaced by the pressure oil into its left hand position, in which position pressure oil can pass from the pipe 243 through the groove 247 into the part of the pipe 115 leading towards the left. Whereas the pipe 115 in the above described manner (through 60, 66, 69) was connected with the outside, pressure oil is now supplied through the left part of the same, pipe 115 to the piston 173 and through the pipe 116 to the cylinder 40 to the right of the piston 39. The friction clutch is thereby engaged, the roller 183 is laid against the cam track 184 and the speed of rotation of the engine is increased by the increased fuel supply. The gear change clutch half to be engaged is rotated at a speed at which it can be engaged, engagement being effected by the piston 49 travelling to the left. The pendulums 122 move the slide valve 124 again into the normal left hand end position, the pressure oil supply against the right hand end of the slide valve 244 ceases, so that valve 244 returns to its right hand end position, and connection of the two parts of the pipe 115 is again effected through the passage 246.

If the piston 50 in the cylinder 48 effects a downward gear change, the presure oil adjusting the slide valve 244 can pass through the passages 234 or 236 in the slide valve 53 and through the passage 239 in the slide valve 54.

We claim:

1. A control system for vehicles driven by an internal combustion engine comprising, in combination, a change speed gear including a drive shaft, an automatic gear change apparatus responsive to the speed of said drive shaft for changing the gears of said change speed gear at predetermined drive shaft speeds, a centrifugal governor driven by the engine, a first cam member adjustable by said centrifugal governor, a cam on said cam member, a first linkage having an element in contact with said cam, means responsive to the movement of said linkage for changing the rate of fuel supply to said engine, a second cam member adapted to be actuated by the vehicle driver, a first and a second cam on said second cam member, a second and a third linkage, each of said second and of said third linkage having one element in contact with the first cam and with said second cam, respectively, of the second cam member, means responsive to the movement of said second linkage for varying the position of said first cam member, and means responsive to the movement of said third linkage for adjusting the engine speeds at which said automatic gear change apparatus changes the gears of said change speed gear.

2. A control system as defined in claim 1 in which the automatic gear change apparatus includes a pair of governors, housings for said governors, pressure oil supply conduits connected to said housings, apertures in said housings, affording flow of oil therethrough at predetermined positions of the governors, means responsive to the flow of oil through one of said housings to change gear upwards, means responsive to the flow of oil through the other of said housings to change gear downwards, each of said housings containing a piston movable therein and a spring interposed between said piston and the governor of the respective housing, and movement transmitting means connected with said third linkage and with said pistons for moving the latter against said springs and changing the tension of said springs and thereby changing the engine speeds at which said automatic gear change apparatus changes the gears of said change speed gear.

3. A control system for vehicles driven by an internal combustion engine comprising, in combination, a change speed gear including a drive shaft, an automatic gear change apparatus responsive to the speed of said drive shaft for changing the gears of said change speed gear at predetermined drive shaft speeds, a centrifugal governor driven by the engine, a first cam member adjustable by said centrifugal governor, a pair of cams on said first cam member, a first linkage having one element thereof in contact with one of said cams, a second linkage having one element thereof in contact with the other of said cams, means individually connected with and responsive to the movement of said linkages for varying the rate of fuel supply and the moment of injection, a lever adapted to be actuated by the driver, a second cam member connected with said lever, a first and a second cam on said second cam member, a third and a fourth linkage, each of said third and of said fourth linkage having one element in contact with the first cam and with said second cam, respectively, of the second cam member, means responsive to the movement of said third linkage for varying the position of said first cam member, and means responsive to the movement of said fourth linkage for adjusting the engine speeds at which said automatic gear change apparatus changes the gears of said change speed gear.

4. A control system as defined in claim 3 in which said automatic gear change apparatus includes a pair of governors, housings for said governors, pressure oil supply conduits connected to said housings, apertures in said housings, affording flow of oil therethrough at predetermined positions of said governors, means responsive to the flow of oil through one of said housings to change gear upwards, means responsive to the flow of oil through the other of said housings to change gear downwards, each of said housings containing a piston movable therein and a spring interposed between said piston and the governor of the respective housing, and a pair of bell crank levers connected with and movable in response to the movements of said fourth linkage, said bell crank levers being individually connected with said pistons for moving the latter against said springs and changing the tension of said springs and thereby changing the engine speeds at which said automatic gear change apparatus changes the gears of said change speed gear.

5. A control system for vehicles driven by an internal combustion engine, comprising, in combination, fuel supply control means adjustable by the vehicle driver, a mechanical change speed gear including a drive shaft, an automatic gear change apparatus responsive to the speed of said drive shaft for changing the gears of said change speed gear and comprising means connected with said fuel supply control means for effecting the gear changes at higher engine speeds when the fuel supply is greater and for maintaining substantially the same minimum and maximum engine speeds for all speeds of said change speed gear at the same fuel supply adjusted by the driver, automatic control means connected with said fuel supply control means and being responsive to the speed of the engine for increasing the fuel supply beyond the fuel supply adjusted by the operator, at the aforesaid minimum speeds and for decreasing the fuel supply to the fuel supply adjusted by the operator as the engine speed increases to the maximum speed at which a gear change is effected at the fuel supply adjusted by the operator for increasing the mean effective pressure of the engine beyond that which is normal at the minimum speeds of the speed ranges of the individual gears of said change speed gear at the engine output corresponding to the fuel supply adjusted by the operator and for effecting a mean effective pressure of the engine at the maximum speeds of the speed ranges of the individual gears of said change speed gear which pressure is substantially normal at the engine output corresponding to the fuel supply adjusted by the vehicle operator.

6. A control system according to claim 5, said fuel supply control means comprising a cam member adapted to be rotated by the vehicle operator and having a circumferential cam surface and an axially extending cam surface, and said automatic control means comprising a centrifugal regulator connected with the engine and with said cam member for axial displacement of said cam member according to the speed of the engine.

7. A control system according to claim 5, said fuel supply control means comprising a cam member adapted to be partially rotated by the vehicle operator and having two cams, each of said cams forming a circumferential cam surface and an axially extending cam surface, said automatic control means comprising a centrifugal regulator connected with the engine and with said cam member for axial displacement of said cam member according to the speed of the engine, a fuel pump, first cam follower means engaging one of said cams and being connected with said fuel pump for controlling the fuel supplied to the engine, means for injecting the fuel supplied by said pump, and second cam follower means engaging the other of said cams and being connected with said fuel injection means for controlling the moment of fuel injection into the engine.

References Cited in the file of this patent

UNITED STATES PATENTS

| Number | Name | Date |
|---|---|---|
| 1,701,274 | Rabbidge | Feb. 5, 1929 |
| 2,008,231 | Vincent | July 16, 1935 |
| 2,089,590 | Walti | Aug. 10, 1937 |
| 2,178,356 | Brunner | Oct. 31, 1939 |
| 2,213,683 | Banning | Sept. 3, 1940 |
| 2,283,284 | Owner | May 19, 1942 |
| 2,303,951 | Oswald | Dec. 1, 1942 |

(Other references on following page)

UNITED STATES PATENTS

| Number | Name | Date |
|---|---|---|
| 2,306,733 | Joslyn | Dec. 29, 1942 |
| 2,330,388 | Scott-Paine | Sept. 28, 1943 |
| 2,352,212 | Lang | June 27, 1944 |
| 2,422,850 | Porter | June 24, 1947 |

FOREIGN PATENTS

| Number | Country | Date |
|---|---|---|
| 546,857 | Great Britain | July 31, 1942 |
| 889,074 | France | Dec. 30, 1943 |
| 924,103 | France | Jan. 28, 1947 |

OTHER REFERENCES

Ser. No. 281,826, Stieglitz (A. P. C.), published May 18, 1943.

Report on Development of Petrol Injection Engine (British Intelligence Objectives Sub-Committee), Maybach H. L. 234, issue date 1947.